(12) United States Patent
Smith et al.

(10) Patent No.: US 7,221,684 B1
(45) Date of Patent: May 22, 2007

(54) INCREASING NETWORK EFFICIENCY USING PACKET COMPRESSION AND DECOMPRESSION

(75) Inventors: Malcolm M. Smith, Calgary (CA); Tmima Koren, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 858 days.

(21) Appl. No.: 10/042,914

(22) Filed: Jan. 8, 2002

(51) Int. Cl.
*H04J 3/18* (2006.01)

(52) U.S. Cl. ............... 370/477; 370/474; 370/393

(58) Field of Classification Search ........... 370/477, 370/474, 393
See application file for complete search history.

(56) References Cited

U.S. PATENT DOCUMENTS

| | | | | |
|---|---|---|---|---|
| 4,747,096 | A | | 5/1988 | Piasecki et al. ............ 370/81 |
| 4,764,921 | A | * | 8/1988 | Graves et al. ............ 370/510 |
| 4,860,313 | A | | 8/1989 | Shpiro ............ 375/27 |
| 5,117,453 | A | | 5/1992 | Piasecki et al. ............ 379/100 |
| 5,497,505 | A | | 3/1996 | Koohgoli et al. ............ 455/34.1 |
| 5,894,557 | A | | 4/1999 | Bade et al. ............ 395/200.58 |
| 5,905,736 | A | | 5/1999 | Ronen et al. ............ 370/546 |
| 5,956,391 | A | | 9/1999 | Melen et al. ............ 379/114 |
| 5,970,477 | A | | 10/1999 | Roden ............ 705/32 |
| 6,047,051 | A | | 4/2000 | Ginzboorg et al. ............ 379/130 |
| 6,088,351 | A | * | 7/2000 | Jenkin et al. ............ 370/347 |
| 6,134,245 | A | | 10/2000 | Scarmalis ............ 370/474 |
| 6,141,385 | A | * | 10/2000 | Yamaji ............ 375/240.27 |
| 6,192,051 | B1 | | 2/2001 | Lipman et al. ............ 370/389 |
| 6,363,065 | B1 | | 3/2002 | Thornton et al. ............ 370/352 |
| 6,400,722 | B1 | | 6/2002 | Chuah et al. ............ 370/401 |
| 6,424,940 | B1 | | 7/2002 | Agassy et al. ............ 704/219 |
| 6,477,595 | B1 | | 11/2002 | Cohen et al. ............ 710/105 |
| 6,512,754 | B2 | | 1/2003 | Feder et al. ............ 370/338 |
| 6,512,773 | B1 | | 1/2003 | Scott ............ 370/395.61 |
| 6,512,790 | B1 | | 1/2003 | Sourani ............ 375/240 |
| 6,618,397 | B1 | * | 9/2003 | Huang ............ 370/474 |
| 2001/0014105 | A1 | * | 8/2001 | Tezuka et al. ............ 370/474 |
| 2001/0025321 | A1 | * | 9/2001 | Tang et al. ............ 709/246 |
| 2002/0059114 | A1 | | 5/2002 | Cockrill et al. ............ 705/27 |

FOREIGN PATENT DOCUMENTS

| | | |
|---|---|---|
| WO | WO 98/26381 | 12/1997 |
| WO | WO 99/31610 | 12/1998 |
| WO | WO 99/35875 | 7/1999 |
| WO | WO 00/64204 | 10/2000 |

* cited by examiner

*Primary Examiner*—Huy D. Vu
*Assistant Examiner*—Jason Mattis
(74) *Attorney, Agent, or Firm*—Baker Botts L.L.P.

(57) ABSTRACT

A communication device for compressing packets includes a first interface, a grouping module and a second interface. The first interface receives packets from a group of media streams, the grouping module generates a group packet that includes a group identifier as well as the payloads of the packets, and the second interface communicates the group packet for receipt by a remote device. A communication device for decompressing packets includes a memory, an interface, and a processor. The memory stores state information for a group of media streams, the interface receives a group packet carrying payloads from the media streams, and the processor reconstructs the headers of the packets using the state information.

28 Claims, 4 Drawing Sheets

INCREASING NETWORK EFFICIENCY USING PACKET COMPRESSION AND DECOMPRESSION

TECHNICAL FIELD OF THE INVENTION

This invention relates generally to packet-based communication networks and more particularly to a method for increasing network efficiency using packet compression and decompression.

BACKGROUND OF THE INVENTION

Exponential increases in the amount of wireless traffic have placed greater demands on packet-based network resources. Often, in order to provide consistent and reliable service, wireless service providers must lease expensive network infrastructure components. For example, base transceiver stations in mobile networks may require expensive connections to base station controllers to allow data from mobile units to reach a network. Inefficient use of available resources, therefore, can be an expensive prospect.

SUMMARY OF THE INVENTION

In accordance with the present invention, techniques for increasing network efficiency using packet compression and decompression are provided. In particular, certain embodiments use packet compression techniques to allow more efficient use of existing connections.

In accordance with one embodiment of the present invention, a communication device receives a packet from each of a group of media streams. The network device generates a group packet, which includes an identifier for the group and a payload of from each packet. The network device then communicates the group packet to another network device.

In another embodiment of the present invention, a communication device has a first interface operable to receive a packet from each of a group of media streams. The network device includes a compression module that generates a group packet from the payloads of the packets. The network device also includes a second interface operable to communicate the group packet for receipt by a remote device.

In yet another embodiment of the present invention, a method for decompressing packets includes receiving a group setup message that includes a group identifier associated with a group of media streams and state information for each media stream in the group. The method also includes receiving a group packet that includes the group identifier and the payload of one packet from each of the media streams in the group. The method further includes generating a header based on the state information for each payload in the group packet and combining the payload with reconstructed header to recreate the original packet.

An important technical advantage of the present invention is increased efficiency in packet-based networks. Because the group packets contain less header information than the individual packets, they are easier to carry across networks. Overall, techniques of various embodiments of the present invention require less bandwidth to carry packets compared to many existing techniques.

Other important technical advantages may result from the application of the present invention in existing networks. Increased network efficiency may mean that a network requires fewer connections or lower-bandwidth connections so that the overall cost of the network is reduced. For example, radio access networks (RANs) require a large number of connections between base station transceivers and base station controllers, and the ability to substitute less expensive connections with lower bandwidth can greatly decrease the overall cost of the network.

Another important technical advantage is that certain embodiments of the present invention may provide alternatives to existing techniques for increasing network efficiency, such as configuring the network to encapsulate data in asynchronous transfer mode (ATM) cells. In certain circumstances, the techniques of packet compression in certain embodiments of the present invention may provide greater boosts in efficiency as compared to existing techniques but require less time and effort to implement.

Various embodiments of the present invention may include all, some, or none of the enumerated technical advantages, and these and other technical advantages of the present invention may be better understood by reference to the following figures, description, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
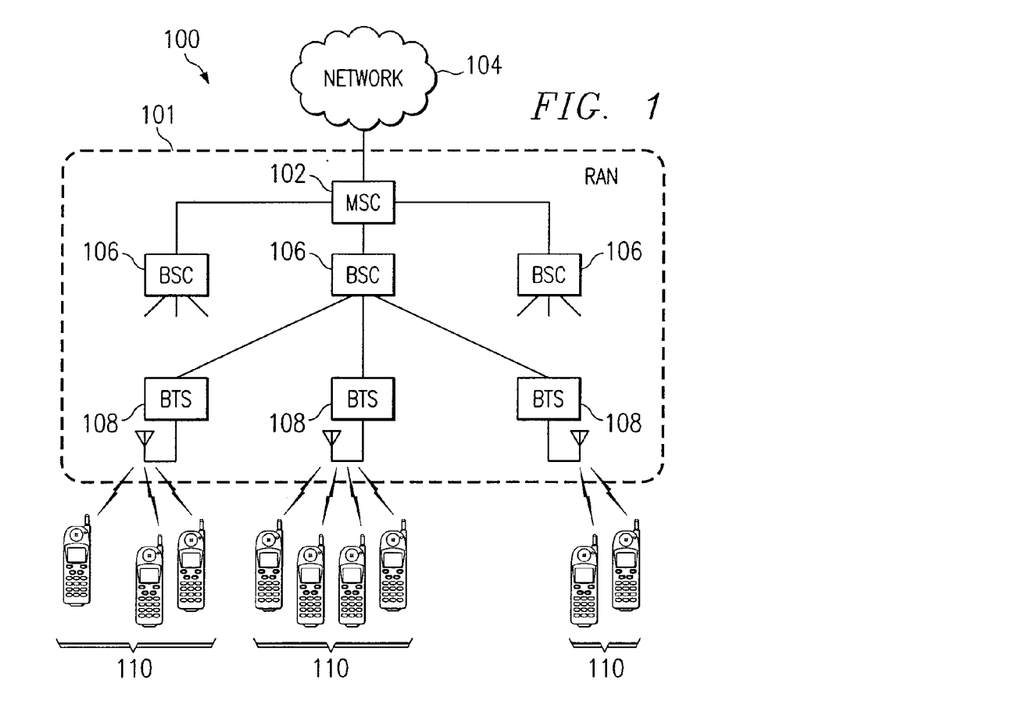
FIG. 1 illustrates a communication system using packet compression and decompression in accordance with one embodiment of the present invention.

FIG. 1 illustrates a communication system 100 that includes components of a radio access network (RAN) 101 coupled to a network 104. RAN 101 provides wireless communication services to mobile units 110 and includes a mobile switching center (MSC), base station controllers (BSCs) 106, and base transceiver stations (BTSs) 108. Overall, system 100 increases the efficiency of packet-based communication by identifying and compressing groups of packets. More specifically, particular embodiments include devices that combine payloads of packets from a group of media streams into a single group packet.

Mobile units 110 provide wireless communications for voice, data, video, audio, signaling, control, or other transmissions (generally referred to as media) using any suitable wireless communication protocols by establishing wireless links with BTSs 108. Mobile units 110 may be analog or digital cellular telephones, personal digital assistants (PDAs), pagers, or other suitable wireless devices providing wireless services for subscribers. Wireless links represent any channel or channels established between devices for the persistent, periodic, or sporadic communication of information using any suitable wireless communication protocol.

Mobile units 110 communicate media encapsulated in frames, cells, packets, or other portions or segments of data (generally referred to as packets) in media streams. The term "media stream" refers to a series of packets communicated by a particular source, such as mobile unit 110.

Each BTS 108 represents hardware and/or software supporting wireless links with mobile units 110 using any suitable packet-switched wireless communication protocols. BTS 108 receives packets from mobile units 110 and communicates the packets to BSC 106 over a communication link. The link between BTS 108 and BSC 106 is often a T1 line or other high-bandwidth connection. Such links tend to be quite expensive, and efficient use of these links is an important goal of many communication systems. BSCs 106 manage wireless resources for one or more BTSs 108. For example, BSC 106 may manage channel setup, frequency hopping, handoffs, and other suitable functions for BTS 108. BSC 106 receives packets from BTS 108 and communicates them to MSC 102.

MSC 102 provides a communication link between RAN 101 and network 104. MSC 102 is a switching node in network 104 that routes information from BSCs 106 into network 104 and conveys information from network 104 back to BSCs 106. In addition to providing communication with network 104, MSC 102 performs various functions for mobile units 110 such as registration, authentication, location updating, handoffs, and call routing to roaming mobile units 110.

Network 104 represents any collection and arrangement of hardware and/or software supporting communications between multiple devices. For example, network 104 may be one or a collection of components associated with the PSTN, local area networks (LANs), wide area networks (WANs), a global computer network such as the Internet, or suitable ground-based or satellite-based wireline or wireless communication technology that supports communication between multiple devices. Thus, network 104 supports communication between components of RAN 101 and other communication devices.

In one exemplary method of operation, BTS 108 receives packets from mobile units 110, identifies groups of media streams from the mobile units 110, and compresses packets from the grouped streams into group packets. BTS 108 establishes a wireless link with one or more mobile units 110, and receives a media stream from each of the mobile units 110. ETS 108 forwards the packets from the media streams to BSC 106 and simultaneously monitors the media streams to identify a group of media streams that meet the group selection criteria stored at BTS 108. Thus, initially, BTS 108 may forward the packets without forming group packets.

Upon identifying a suitable group of media streams, BTS 108 receives a packet or other suitable quantity of information from each media stream in the group and compresses the packets into a group packet. BTS 108 also communicates a group setup message to BSC 106. BTS 208 may generate group setup message at any time before the first group packet is communicated and may communicate group setup message either separately or as part of the first group packet.

Once BSC 106 has received group setup information, BSC 106 may confirm receipt of the group setup information by sending a group setup acknowledgement (ACK) message. In a particular embodiment, the ACK message includes all or part of the group setup information, so that BTS 108 can verify that the group setup information was received correctly. BSC 106 receives the group packet, reconstructs the original packets using the group setup information, and communicates the packets to MSC 102, which in turn transmits the packets to network 104. In an alternative embodiment, BSC 106 forwards the group setup message and the group packets to MSC 102, which may then either reconstruct the packets or forward the group setup message and the group packet to an endpoint of network 104 that reconstructs the packets.

During operation, the number and kind of media streams arriving at BTS 108 may change. For example, a caller could terminate an existing call, or a new caller could begin a call. In certain embodiments, BTS 108 may modify existing groups of media streams in response to detecting termination of a stream in the group or identifying a new candidate stream for the group. In one example of such an embodiment, BTS 108 identifies an addition to or deletion from the group, and communicates updated group setup information to BSC 106. Like the initial group setup message, updated group setup information may be communicated either separately or as part of a group packet that includes a flag or other suitable indication of group setup information. BSC 108 may respond to the updated group setup information with an ACK message to confirm that the group setup information has been updated.

Although particular examples of system 100 and its method of operation have been provided, the techniques of packet compression can be applied to any packet-based network by one skilled in the art. System 100 can include a variety of different or additional components that perform similar functions. For example, analogous components of wireline network may be substituted for their wireless equivalents, such as a wireline communication device in place of mobile unit 110. Because of the numerous variations possible for one skilled in the art, the examples presented should be taken as illustrative rather than restrictive.

Figure 2:
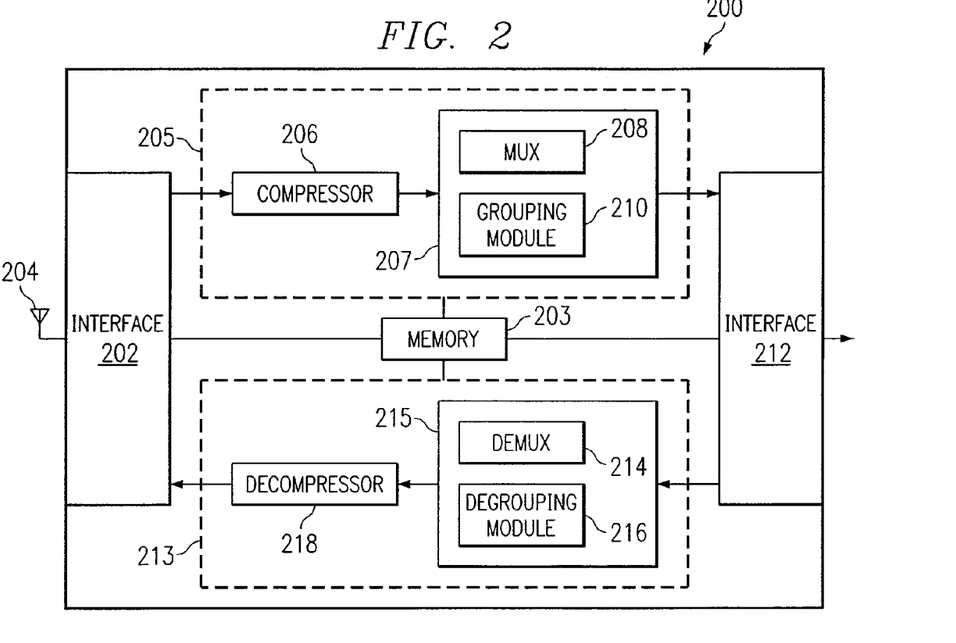
FIG. 2 is an exemplary network device from the communication system including modules for compression and decompression of packets.

FIG. 2 shows an exemplary network device 200 for compressing and decompressing packets. In the embodiment illustrated, device 200 includes functional elements for operation as BTS 108. Network device 200 includes a wireless interface 202 coupled to an antenna 204, a memory 203, a compression module 205, a decompression module 213, and a second interface 212 for communicating with network 104.

Wireless interface 202 couples to antenna 204 and supports wireless links with one or more mobile units 110. Using antenna 204 and wireless interface 202, device 200 exchanges packets with mobile units 110. Generally, wireless interface 202 may take any appropriate form for receiving packets from multiple media streams from communication devices, which may be mobile units 110 or suitable wireline alternatives.

Memory 203 represents any form of information storage, whether volatile or non-volatile, that stores information for network device 200. Memory 203 may include magnetic media, optical media, read-only memory (ROM), removable media, or any other local or remote memory component. In a particular embodiment, memory 203 stores information received by wireless interface 202 and network interface 212, which is then processed by components of network device 200.

Compression module 205 represents components that perform functions associated with packet compression. Compression module 205 includes a compressor 206 and a group selection module 207 that selects between a multiplexer 208 and a grouping module 210.

Compressor 206 processes packets received from interface 202 to reduce their size in memory units. Compressor 206 may be implemented as any combination of hardware and/or software. Compressor 206 may use a standard form of compression, such as compressed User Datagram Protocol (cUDP) compression for packets carried over UDP, so that network device 200 can advantageously exploit existing features of the network protocol.

Group selection module 207 receives compressed packets, identifies media streams that meet group selection criteria, and forms a group of media streams. Group selection module 207 selects packets from the grouped media streams and uses them to generate a group packet using grouping module 210. Group packets reduce the total amount of header information required to carry the payloads of the packets. The remaining packets are multiplexed into a single multiplexed packet using multiplexer 208. Multiplexed packets package multiple packets into a single packet, usually without reducing the total amount of compressed header information. In a particular embodiment, the group packets are multiplexed along with the remaining packets, allowing network device 200 to communicate relatively large amounts of information in a single multiplexed packet.

Network interface 212 exchanges packets with communication devices in RAN 101 or network 104. Network interface 212 may include any port, virtual or physical, direct or indirect, that allows network device 200 to send and receive information in the form of packets. In certain embodiments, wireless interface 202 and network interface 212 use the same hardware and/or software.

Network device 200 uses decompression module 213 to decompresses packets received using network interface 212. Decompression module 213 includes a decompressor 218 and a degrouping selection module 215 that selects between a demultiplexer 214 and a degrouping module 216.

Degrouping selection module 215 receives packets from other network devices using network interface 212, and selects an appropriate form of processing for the packets. For example, when degrouping selection module 215 receives a multiplexed packet, degrouping selection module 215 demultiplexes the multiplexed packet using demultiplexer 214. When degrouping selection module 215 receives a group packet, degrouping selection module 215 degroups the packet using degrouping module 210. In an alternative embodiment in which group packets are included in multiplexed packets, degrouping selection module 216 demultiplexes the multiplexed packet using demultiplexer 214, then degroups the resulting group packets using degrouping module 210.

In operation, network device 200 receives packets from media streams using wireless interface 202. Packets may arrive synchronously, asynchronously, sporadically, or in any other sequence or manner. Compressor 206 compresses the headers of the packets. Group selection module 207 monitors the packets received at wireless interface 202, and determines whether particular media streams meet group selection criteria. For example, group selection module 207 can monitor the time at which packets are received, and identify groups of media streams whose packets arrive at interface 202 at or around the same time (referred to as having the same "periodicity"). While group selection module 207 is identifying groups of media streams, multiplexer 208 is multiplexing the packets received. In the multiplexing process, multiplexer 208 combines multiple packets into a single multiplexed packet, such as a point-to-point protocol (PPP) packet, which is then communicated to another network device by network interface 212.

After a group of media streams is selected, grouping module 210 may generate a group setup message to negotiate communication of group packets with a receiving network device. According to a particular embodiment, the group setup message includes a group identifier, media stream identifiers for the media streams in the group, and state information for each media stream in the group. Grouping module 210 communicates the group setup message using network interface 212 to a network device that will be receiving group packets; e.g., BTS 108 communicates the message to BSC 106. The receiving network device may reply with an ACK message that is received by network device 200 using network interface 212. In certain embodiments, the group setup message is communicated within the first group packet, which includes a flag indicating that group setup information is included in the packet.

Group selection module 207 begins segregating packets from media streams in the group ("grouped" packets) from other packets ("ungrouped" packets). Group selection module 207 sends grouped packets to grouping module 210, which uses the payloads of the packets to generate group packets. For each group packet, grouping module 210 also generates a header for the group packet that includes a group identifier, so that the device receiving the group packet can identify the media streams that provided the packets. Group selection module 207 sends ungrouped packets to multiplexer 208, which multiplexes them into multiplexed packets. In certain embodiments, group packets may be multiplexed into the multiplexed packet as well. Grouping module 210 then communicates the multiplexed and/or group packets to the receiving network device using network interface 212.

Network device 200 can also be on the receiving end of group setup messages, multiplexed packets and group packets using network interface 212. Degrouping selection module 215 segregates the packets into multiplexed packets and group packets. Degrouping selection module 215 demultiplexes the multiplexed packets, which may include group packets, using demultiplexer 214 and degroups the group packets using degrouping module 216.

Demultiplexer 214 recreates separate packets from the multiplexed packets. Demultiplexer 214 takes any appropriate form capable of undoing the processing performed by multiplexer 208. After recreating the packets, demultiplexer 214 forwards them to decompressor 218 or to degrouping module 216. Decompressor 218 reverses the compression performed by compressor 206 and restores the packets to their original state. In a particular embodiment, demultiplexer 214 generates cUDP packets, and decompressor 206 performs cUDP decompression on the cUDP packets to generate UDP packets.

Degrouping module 216 reverses the process performed by grouping module 210. Degrouping module 210 separates the payloads of packets in a group packet, and uses state information from a received group setup message or group packet to reconstruct the compressed headers of the packets. Then degrouping module 216 reconstructs the packets from the payloads and the compressed headers, and communicates the packets to decompressor 218. In certain embodiments that include group packets in multiplexed packets, degrouping module 216 receives group packets from demultiplexer 216 after demultiplexer 216 removes the group packets from a multiplexed packet.

Although network device 108 has been illustrated with particular functional components, numerous variations are possible for one skilled in the art. The functions of network device 200 may be performed by MSC 102, BSC 106, BTS 108, or any suitable network device. Components may be embodied as hardware, software or both, and particular components may be replaced, added or omitted without substantially affecting the packet compression techniques performed by network device 200. For example, compressor 206, decompressor 218 and even multiplexer 208 may be omitted without changing the grouping functions performed by network device 200. Or BTS 108 could perform compression but not decompression. Furthermore, different embodiments might be used to obtain different advantages under certain circumstances. For example, using a compressor and decompressor reduces the amount of reconstruction performed by degrouping module 216, thus allowing the group setup messages to be smaller. Because of the wide variety of possible modifications and the range of different advantages that these modifications allow, the described embodiment of network device 200 should be taken as an example, not as an exclusive definition.

Figure 3:
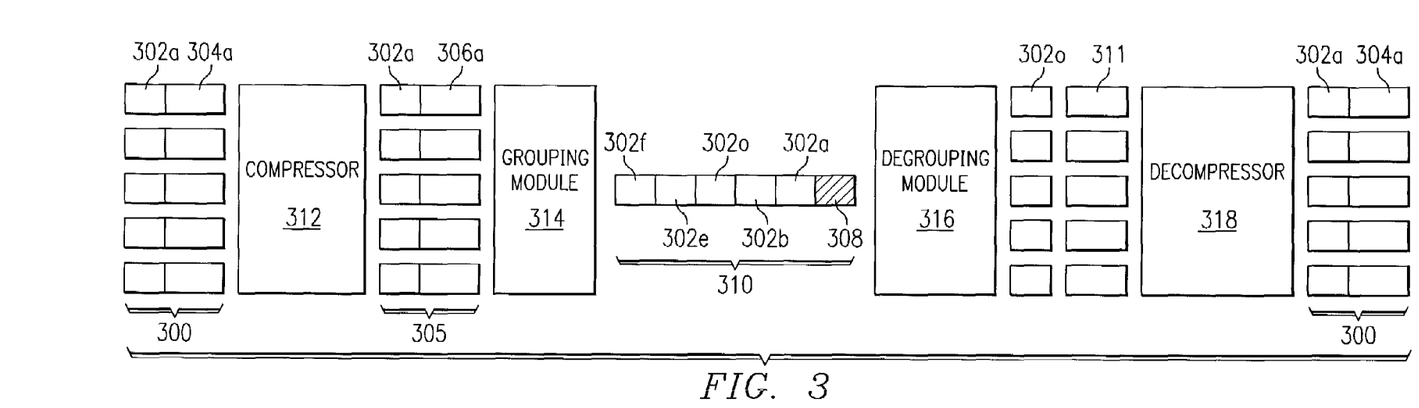
FIG. 3 shows an exemplary process for compressing and decompressing packets in the communication system.

FIG. 3 illustrates the process of compression and decompression for grouped media streams. The process includes a compressor 312 and a grouping module 314 in a sending network device, and a degrouping module 316 and a decompressor 318 in a receiving network device. Each of these components functions similarly to analogous components of network device 200 described in connection with FIG. 2.

Packets 300 include headers 304 and payloads 302. Header 304 may be considerably larger than the corresponding payload 302 so that reducing the amount of header information carried over a connection significantly improves the efficiency of the connection. Compressor 312 compresses packets 300 into compressed packets 305 by compressing headers 304 into compressed headers 306. Grouping module 314 groups compressed packets 305 into a group packet 310. Group packet includes payload 302 of each packet 300/compressed packet 305 as well as a group header 308, which may include information identifying the group of media streams from which the packets have been taken. The group packet is then communicated to the receiving device. By removing content from compressed headers 306 of compressed packets 305, grouping module 314 reduces the amount of bandwidth required to carry compressed packets 305 to the receiving device.

When group packet 310 arrives at the receiving device, degrouping module 316 separates the group packet into payloads 302 and generates reconstructed headers 311. According to particular embodiments, degrouping module 316 uses state information from a group setup message or group packet to generate reconstructed headers 311. Reconstructed headers 311 correspond to compressed headers 306. Decompressor 318 decompresses the reconstructed headers 311 into the original uncompressed headers 304, thereby recreating the original packets 300.

The depicted process is only one example of numerous variations that will be apparent to one skilled in the art. For example, steps could be left out of the process, e.g., compression and decompression, or steps of the process may be performed simultaneously, e.g., degrouping and decompression. So long as the overall process involves communicating payloads 302 of packets 300 using less information than compressed headers 306, the process can increase network efficiency.

Figure 4:
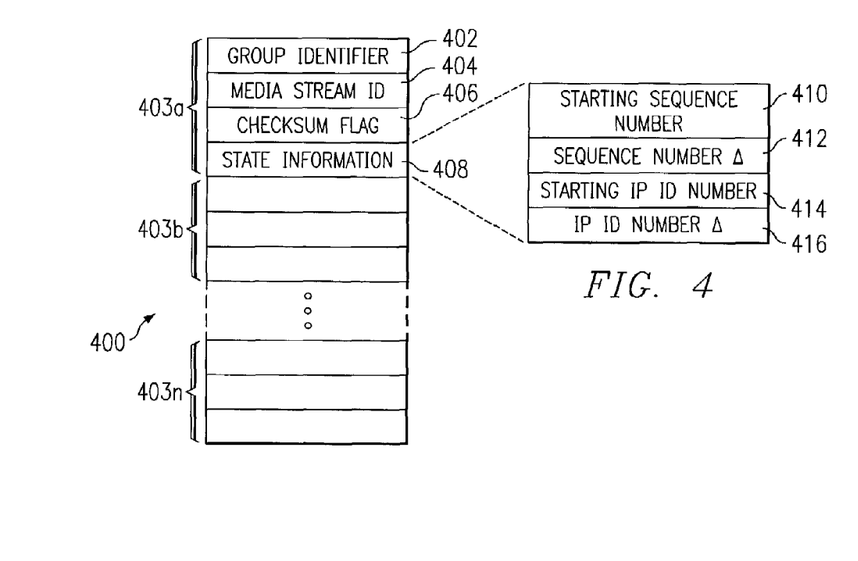
FIG. 4 shows an exemplary group setup message communicated by the network device to establish compression parameters.

FIG. 4 shows an exemplary group setup message 400 that includes information for identifying group packets and reconstructing packets. Group setup message 400 includes information that allows a network device that receives group setup message 400 to reconstruct headers of packets from media streams in the group. Group setup message includes a group identifier 402 that is used by the receiving network device to identify the group of media streams that contributed packets to a particular group packet. Group setup message 400 also includes characteristic information 403a, 403b, . . . , 403n (generally referred to as characteristic information 403) for each media stream in the group. The ordering of characteristic information 403a, 403b, . . . , 403n in the group setup message corresponds to the order that packet payloads from each media stream will be arranged in group packets. Characteristic information 403 includes a media stream identifier 404, a checksum flag 406, and state information 408. Media stream identifier 404 is any appropriate identifier for a media stream, and in a particular embodiment, may be a context identifier used in the headers of UDP packets in the stream. Checksum flag 406 indicates to the degrouping module that the degrouping module should look for a checksum when parsing the group packet and separating the group packet into payloads. State information 408 allows the degrouping module to reconstruct headers of packets in the group identified by group identifier 402.

An example of state information 408 is shown to the right of setup message 400. State information 408 includes a starting sequence number 410, a sequence number delta 412, a starting IP ID number 414, and an IP ID number delta 416. A network device uses starting sequence number 410 and sequence number delta 412 to determine the sequence number of any given packet based on that information and a count of how many group packets the device has received. For example, if the sequence number delta is one, and the starting sequence number is one, then the third group packet received would have a sequence number of three in the reconstructed header. The network device uses starting IP ID number 414 and delta 416 in a similar way to calculate the IP ID number for a given packet.

Group setup message 400 is not limited to the depicted embodiment. Instead, group setup message 400 may include any suitable information allowing a network device to identify packets in a group packet and to reconstruct at least a portion of the header information from those packers. One example is modifying group setup message 400 for protocols other than IP. Another example is omitting IP ID number 414 and IP ID delta 416 when the IP ID number of packets does not fall into a consistent pattern, as when network applications use IP fragments rather than full packets.

The information in group setup message 400 may be communicated and used in a variety of ways as well. For example, group setup message 400 may be communicated as part of a group packet rather than as a separate message. Receiving devices may acknowledge receipt of group setup message 400 by returning all or part of the group setup information. For instance, a receiving device could generate an ACK message that includes the group identifier 402 and the media stream identifiers 404 to verify the composition of the group.

Group setup message 400 may also be used to update previous group setup information. For example, group setup message 400 could include a group identifier 402, a media stream identifier 404 for a media stream that will be added or deleted from the group, and a flag indicating the type of change (e.g., addition, deletion) made to the group. In a particular embodiment, group setup message 400 also includes information about the position for the new media stream in the group. These and other embodiments of updated group setup information may be included in group packets or communicated separately.

Numerous variations of group setup message 400 have been described, and still more will be apparent to one skilled in the art. For this reason, the described embodiments of group setup message 400 should be regarded as illustrations rather then restrictive definitions.

Figure 5:
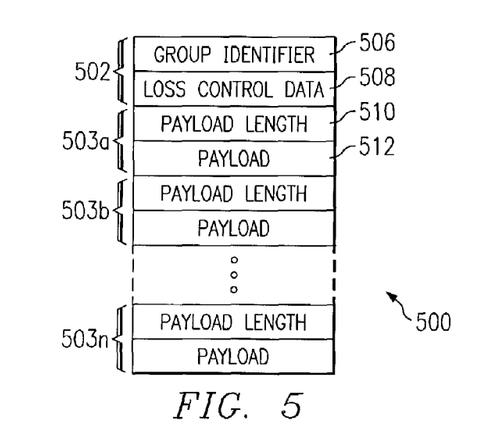
FIG. 5 shows an exemplary group packet generated by the network device.

FIG. 5 shows an exemplary group packet 500. Group packet 500 includes a group header 502 and payloads 504. Group header 502 includes a group identifier 506 allowing a network device to identify the group of media streams from which the payloads of packets in group packet 500 were taken. Group header 502 also includes loss control data 508 to enable the grouping module to determine whether it has missed any group packets. According to a particular embodiment, loss control data 508 is a sequence number for group packet 500.

For each media stream in the group, group packet 500 has a payload section 503*a*, 503*b*, . . . , 503*n* (generally referred to as payload sections 503) that includes a payload 512 for each packet as well as a payload length 510. The payload sections 503 for each media stream are arranged in corresponding order to characteristic information 403. Thus, the network device can determine the source of each payload 512 by its position in the order of payload 512 in group packet 500. Payload length 510 allows the degrouping module to determine when it has reached the end of a packet payload 512. A checksum flag 406 from group setup message 400 instructs the network device to look for an attached checksum within payload 512.

Again, variations on group packet 500 will be apparent to one skilled in the art. For example, instead of using the order of payloads 512 in group packet 500 to indicate the source of each payload 512, the group packet 500 could include a media stream identifier in each payload section 503 that identifies the source of each payload 512. Group packet 500 may include some or all of the initial information or updated information from group setup message 400, and may include a flag or other suitable indication that group packet 500 includes such information. The structure or contents for group packet 500 may be modified to match modifications in group setup message 400 as well. Consequently, the description of group packet 500 should be seen as an example rather than as an exclusive definition.

Figure 6:
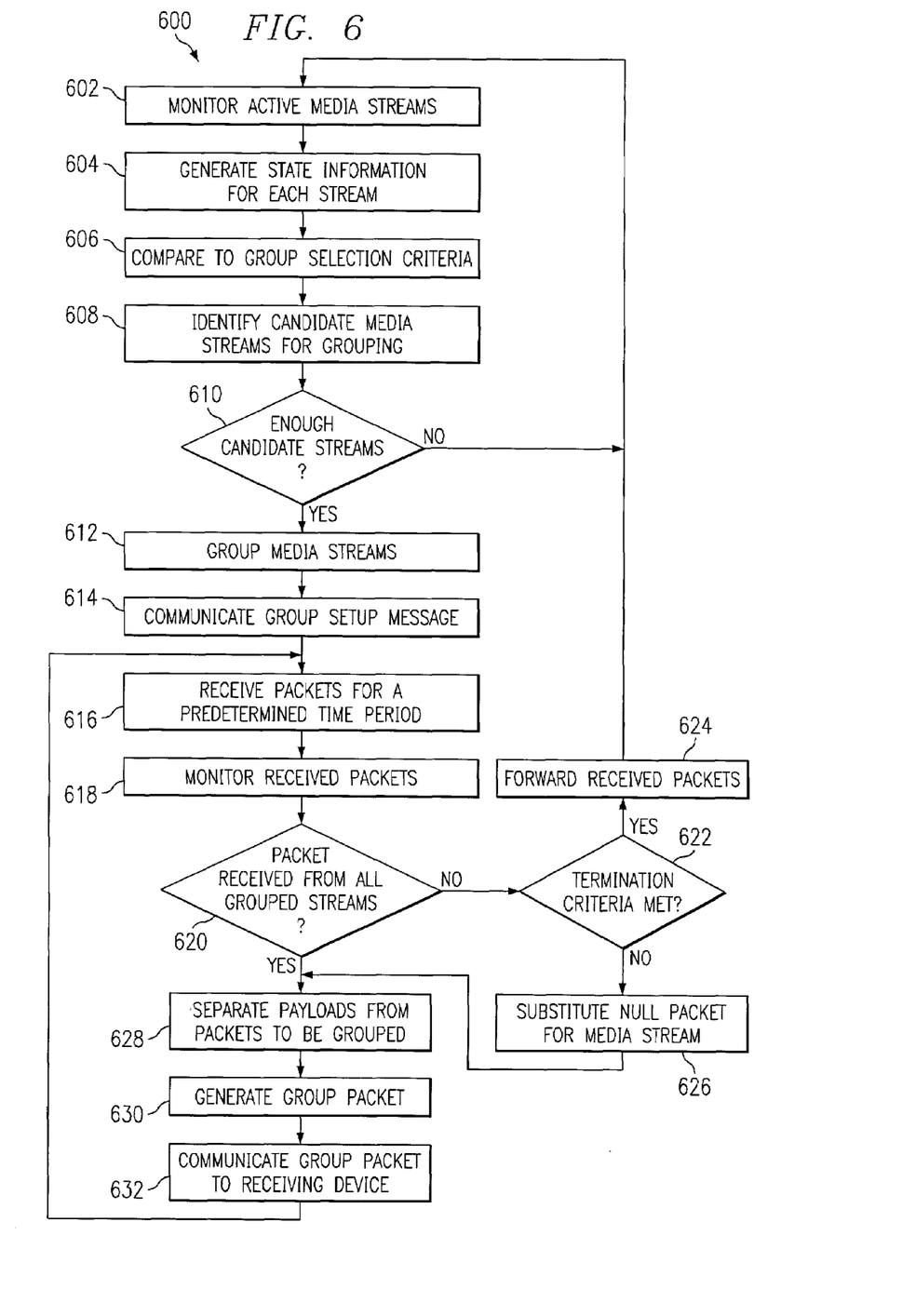
FIG. 6 is a flowchart showing an exemplary method for compressing packets.

FIG. 6 is a flowchart 600 showing an exemplary method for compressing packets at BTS 108. BTS 108 monitors active media streams at step 602. BTS 108 generates state information for each media stream at step 504. BTS 108 compares its observations of media streams to group selection criteria at step 606 and identifies candidate media streams for grouping based on that comparison at step 608.

BTS 108 determines if a sufficient number of candidate streams have been identified at step 608. If not enough candidate streams have been identified, ETS 108 continues monitoring at step 602. If there are enough candidate streams, BTS 108 forms a group of media streams at step 612. According to a particular embodiment, BTS 108 forms the group by collecting state information for each media stream in the group and by determining a group identifier for the group. Once a group is formed, ETS 108 generates and communicates a group setup message to a network device that will be receiving group packets at step 614.

BTS 108 receives packets from the media streams for a predetermined time period at step 616 and monitors the received packets during that period at step 618. After the time period elapses, BTS 108 determines whether it has received a packet or other suitable quantity of information from all of the grouped media streams at step 620. If a packet has not been received from each of the media streams, BTS 108 determines if the stream should be terminated. To make the determination, BTS 108 examines termination criteria, such as whether a termination message has been received for the stream or whether BTS 108 has missed a certain number of packets for the stream.

If the termination criteria have not been met, BTS 108 substitutes a null payload for the payload of the missed packet and proceeds to step 628. The null payload substitutes for a payload that would otherwise be missing from the group packet, allowing a group packet to be formed even when packets are missed. If instead the termination criteria have been met, BTS 108 terminates the stream and forwards the packets it has already received to their destination at step 624. BTS 108 then attempts to create another group from step 602.

Once a packet has been received from each media stream and null payloads have been substituted for missing packets, BTS 108 separates the payloads of the packets from the headers at step 628. BTS 108 generates a group packet from the payloads at step 630. At step 632, BTS 108 communicates the group packet to the receiving device, either separately or as part of a multiplexed packet. Once the group packet has been communicated, BTS 108 continues to monitor received packets and generate group packets as described from step 616.

Flowchart 600 shows a method of packet compression that is subject to numerous modifications by a person skilled in the art. For example, BTS 108 could communicate the group setup message as part of the first group packet. In another example, instead of forming a new group when a media stream is terminated, BTS 108 could modify the existing group by removing the terminated stream, and proceed with the method from there. Similarly, BTS 108 could continuously monitor for new candidate streams and add them to the group by communicating updated state information to the receiving device. The described method, therefore, should not be interpreted to exclude other variations and modifications; rather, it should be taken as one example of many possible implementations.

Figure 7:
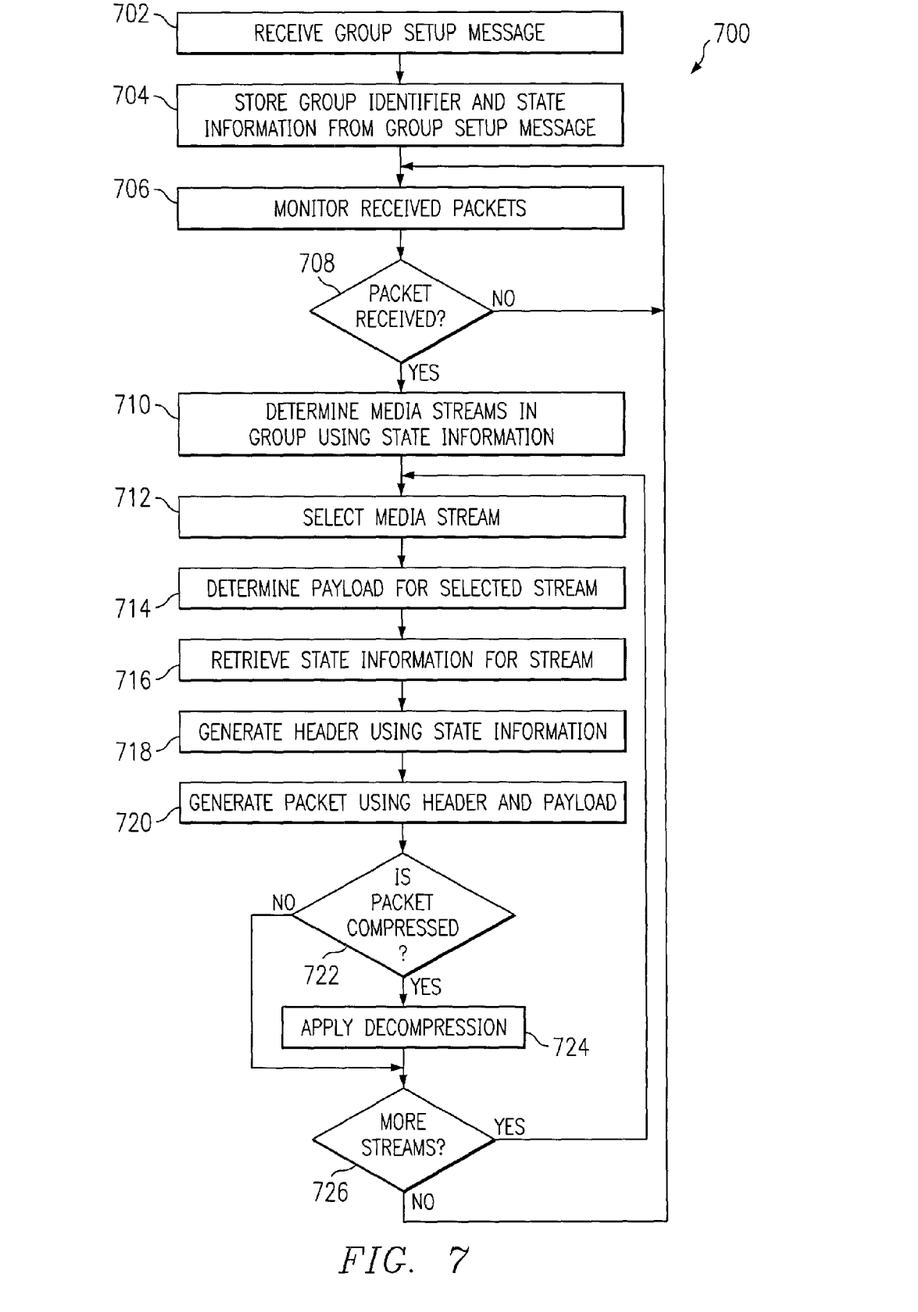
FIG. 7 is a flowchart showing an exemplary method for decompressing packets.

FIG. 7 is a flowchart 700 showing an exemplary method for decompressing packets at BSC 106. At step 702, BSC 106 receives a group setup message. BSC 106 stores the group identifier and the state information in the group setup message at step 704. In certain embodiments, the state information stored is updated at various times as the network device receives packets; for example, the current sequence number may be stored instead of the original sequence number.

BSC 106 monitors received packets at step 706. BSC 106 determines whether a packet is a group packet at step 708. If the packet is not a group packet, BSC 106 continues to look for a group packet at step 706. If a group packet is received, BSC 106 determines what media streams are in the group using the group identifier of group packet at step 710.

BSC 106 selects one of the media streams in the group at step 712, in the order that the media streams were identified in the group setup message. BSC 106 then determines the part of the group packet that is the payload for that stream at step 714. BSC 106 retrieves state information for that stream at step 610. BSC 106 then generates the header corresponding to the payload using the state information for the corresponding media stream at step 718. Once the header is generated, BSC 106 reconstructs the packet using the header and the payload at step 720.

BSC 106 then determines whether the packet is compressed at step 722. If the packet is compressed after reconstruction, BSC 106 can decompress the packet at step

724. Once the packet is reconstructed and decompressed if necessary, BSC 106 determines whether there are any more media streams whose packets have not been reconstructed at step 726. If there are media streams remaining, BSC 106 selects a new media stream at step 712. If no more media streams remain, BSC 106 monitors received packets at step 706 and looks for a new group packet.

The method for decompression should be regarded as an example rather than an exclusive definition, as many variations are possible for one skilled in the art. For example, another device, such as MSC 102, BTS 108 or any other packet-based communication device, may perform the decompression. The description of the method, therefore, should not be construed to exclude such variations.

Although the present invention has been described in several embodiments, a myriad of changes and modifications may be suggested to one skilled in the art. It should be understood that present invention encompasses such changes and modifications as fall within the scope of the present appended claims.

What is claimed is:

1. The method for compressing packets, comprising:
   receiving, at a first network device, a plurality of packets, each packet from a separate one of a group of media streams, each packet comprising a payload and a header;
   generating a group packet, the group packet comprising:
      a group identifier identifying the group of media streams; and
      the payload of each of the packets;
   communicating the group packet to a second network device, wherein each of the media streams is synchronous; and
   identifying the group of media streams by determining that the media streams in the group have the same periodicity, wherein a group setup message is replied to with an acknowledgement, the acknowledgement comprising:
   the group identifier; and
   an identifier for each media stream in the group.

2. The method of claim 1, further comprising:
   generating the group setup message, the group setup message comprising:
      the group identifier; and
      state information for each media stream in the group; and
   communicating the group setup message to the second network device.

3. The method of claim 2, wherein the state information enables the second network device to:
   reconstruct the headers corresponding to the payloads in the group packet; and
   reform the corresponding packets from the reconstructed headers and the corresponding payloads.

4. The method of claim 3, wherein:
   the packets are Internet protocol (IP) packets carried over User Datagram Protocol (UDP);
   the method further comprises compressing each packet into a compressed UDP (cUDP) packet comprising the payload of each packet and a compressed header; and
   the state information permits the second network device to reconstruct the compressed headers.

5. The method of claim 1, further comprising multiplexing the group packet into a multiplexed packet with a plurality of other packets.

6. A communication device, comprising:
   a first interface operable to receive a plurality of packets, each packet from a separate one of a group of media streams, each packet comprising a payload and a header;
   a grouping module operable to generate a group packet, the group packet comprising:
      a group identifier identifying the group of media stream; and
      the payload of each of the packets; and
   a second interface operable to communicate the group packet for receipt by a remote device, wherein each of the media streams is synchronous; and
   the group of media streams is identified by determining that the media streams in the group have the same periodicity, wherein a group setup message is replied to with an acknowledgement, the acknowledgement comprising:
   the group identifier; and
   an identifier for each media stream in the group.

7. The communication device of claim 6, wherein:
   the grouping module is further operable to generate the group setup message, the group setup message comprising:
      the group identifier; and
      state information for each media stream in the group; and
   the second interface is further operable to communicate the group setup message to the remote device.

8. The communication device of claim 6, further comprising a multiplexer operable to multiplex the group packet into a multiplexed packet with a plurality of other packets.

9. A computer program embodied in a computer readable medium performing the steps of:
   receiving, at a first network device, a plurality of packets, each packet from a separate one of a group of media streams, each packet comprising a payload and a header;
   generating a group packet, the group packet comprising:
      a group identifier identifying the group of media streams; and
      the payload of each of the packets;
   communicating the group packet to a second network device, wherein each of the media streams is synchronous; and
   identifying the group of media streams by determining that the media streams in the group have the same periodicity, wherein a group setup message is replied to with an acknowledgement, the acknowledgement comprising:
   the group identifier; and
   an identifier for each media stream in the group.

10. The computer program of claim 9, wherein the computer program further performs the steps of:
    generating a group setup message, the group setup message comprising:
       the group identifier; and
       state information for each media stream in the group; and
    communicating the group setup message to the second network device.

11. The computer program of claim 10, wherein the state information enables the second network device to:
    reconstruct the headers corresponding to the payloads in the group packet; and
    reform the corresponding packets from the reconstructed headers and the corresponding payloads.

12. The computer program of claim 11, wherein:
the packets are Internet protocol (IP) packets carried over User Datagram Protocol (UDP);
the method further comprises compressing each packet into a compressed UDP (cUDP) packet comprising the payload of each packet and a compressed header; and
the state information permits the second network device to reconstruct the compressed headers.

13. A system for compressing packets, comprising:
means for receiving, at a first network device, a plurality of packets, each packet from a separate one of a group of media streams, each packet comprising a payload and a header;
means for generating a group packet, the group packet comprising:
a group identifier identifying the group of media streams; and
the payload of each of the packets;
means for communicating the group packet to a second network device, wherein each of the media streams is synchronous; and
means for identifying the group of media streams by determining that the media streams in the group have the same periodicity, wherein a group setup message is replied to with an acknowledgement, the acknowledgement comprising:
the group identifier; and
an identifier for each media stream in the group.

14. A method for decompressing packets, comprising:
receiving a group setup message, the group setup message comprising:
a group identifier associated with a group of media streams, each stream comprising a plurality of media packets, each media packet comprising a header and a payload; and
state information for each media stream;
receiving a group packet, the group packet comprising:
the group identifier; and
the payload of one media packet from each media stream in the group; and
for each payload in the group packet:
reconstructing a header for the payload based on the state information for the corresponding media stream;
combining the reconstructed header with the corresponding payload from the group packet to form a reconstructed media packet, wherein each of the media streams is synchronous; and
identifying the group of media streams by determining that the media streams in the group have the same periodicity, wherein a group setup message is replied to with an acknowledgement, the acknowledgement comprising:
the group identifier; and
an identifier for each media stream in the group.

15. The method of claim 14, wherein the step of reconstructing the header comprises:
determining a first portion of the header based on the state information;
determining a second portion of the header by applying decompression to the first portion of the header; and
reconstructing the header from the first and second portions of the header.

16. The method of claim 15, wherein:
the media packets are Internet protocol (IP) packets;
the first portion of the header is a compressed User Datagram Protocol (cUDP) header; and
the second portion of the header is determined using cUDP decompression.

17. The method of claim 14, wherein the group packet includes the group setup message.

18. The method of claim 14, further comprising:
receiving updated state information for one or more of the media streams; and
updating the corresponding state information.

19. A communication device, comprising:
a memory operable to store a group identifier associated with a group of media streams and further operable to store state information about each media stream, each media stream comprising a plurality of media packets, each media packet comprising a header and a payload;
an interface operable to receive a group packet, the group packet comprising:
the group identifier; and
a payload from one media packet from each media stream; and
a processor operable to:
reconstruct a header corresponding to each payload in the group packet using the state information;
reconstruct the media packets from the corresponding headers and payloads, wherein each of the media streams is synchronous; and
identify the group of media streams by determining that the media streams in the group have the same periodicity, wherein:
the processor is further operable to generate an acknowledgement, the acknowledgement comprising:
the group identifier; and
an identifier for each media stream in the group; and
the interface is further operable to communicate the acknowledgement to a network device that sent a group setup message.

20. The communication device of claim 19, wherein reconstructing the header comprises:
determining a first portion of the header based on the state information;
determining a second portion of the header by applying decompression to the first portion of the header; and
reconstructing the header from the first and second portions of the header.

21. The communication device of claim 20, wherein:
the media packets are Internet protocol (IP) packets;
the first portion of the header is a compressed User Datagram Protocol (cUDP) header; and
the second portion of the header is determined using cUDP decompression.

22. The communication device of claim 19, wherein the group packet further comprises:
the group identifier; and
the state information for the media streams.

23. The communication device of claim 19, wherein the interface is further operable to receive a group setup message comprising the group identifier and the state information for the media streams.

24. The communication device of claim 19, wherein:
the interface is further operable to receive updated state information for one or more of the media streams; and
the processor is further operable to update the corresponding state information.

25. Logic embodied in a computer readable medium operable to perform the steps of:
 receiving a group setup message, the group setup message comprising:
  a group identifier associated with a group of media streams, each media stream comprising a plurality of media packets, each media packet comprising a header and a payload; and
  state information for each media stream;
 receiving a group packet comprising:
  the group identifier; and
  the payload of one media packet from each media stream in the group; and
 for each payload in the group packet:
  reconstructing a header for the payload based on the state information for the corresponding media stream;
  combining the reconstructed header with the corresponding payload from the group packet to form a reconstructed media packet, wherein each of the media streams is synchronous; and
  identifying the group of media streams by determining that the media streams in the group have the same periodicity, wherein a group setup message is replied to with an acknowledgement, the acknowledgement comprising:
 the group identifier; and
 an identifier for each media stream in the group.

26. The logic of claim 25, wherein the step of reconstructing the header comprises:
 determining a first portion of the header based on the state information;
 determining a second portion of the header by applying decompression to the first portion of the header; and
 reconstructing the header from the first and second portions of the header.

27. The logic of claim 26, wherein:
 the media packets are Internet protocol (IP) packets;
 the first portion of the header is a compressed User Datagram Protocol (cUDP) header; and
 the second portion of the header is determined using cUDP decompression.

28. A system for decompressing packets, comprising:
 means for receiving a group setup message comprising:
  a group identifier associated with a group of media streams, each stream comprising a plurality of media packets, each media packet comprising a header and a payload; and
  state information for each media stream;
 means for receiving a group packet, the group packet comprising:
  the group identifier; and
  the payload of one media packet from each media stream in the group; and
 means for reconstructing a header for the payload based on the state information for the corresponding media stream for each payload in the group packet;
 means for combining the reconstructed header with the corresponding payload from the group packet to form a reconstructed media packet for each payload in the group packet, wherein each of the media streams is synchronous; and
means for identifying the group of media streams by determining that the media streams in the group have the same periodicity, wherein a group setup message is replied to with an acknowledgement, the acknowledgement comprising:
 the group identifier; and
 an identifier for each media stream in the group.

* * * * *